Jan. 9, 1934.   O. H. BASQUIN ET AL   1,942,405
COTTON PICKING MEANS
Filed June 15, 1932   7 Sheets-Sheet 1

Jan. 9, 1934. O. H. BASQUIN ET AL 1,942,405
COTTON PICKING MEANS
Filed June 15, 1932   7 Sheets-Sheet 2

Jan. 9, 1934.   O. H. BASQUIN ET AL   1,942,405
COTTON PICKING MEANS
Filed June 15, 1932   7 Sheets-Sheet 5

Inventors:
O. H. Basquin, C. Harazin and
J. T. Gerlach,
by Wm. F. Freudenreich
Atty Jan. 9, 1934.　　O. H. BASQUIN ET AL　　1,942,405
COTTON PICKING MEANS
Filed June 15, 1932　　7 Sheets-Sheet 6

Jan. 9, 1934.  O. H. BASQUIN ET AL  1,942,405
COTTON PICKING MEANS
Filed June 15, 1932  7 Sheets-Sheet 7

Patented Jan. 9, 1934

1,942,405

UNITED STATES PATENT OFFICE 1,942,405

COTTON PICKING MEANS

Olin H. Basquin, Evanston, and Charles Harazin and Glendon T. Gerlach, Chicago, Ill., assignors to George R. Meyercord, Chicago, Ill.

Application June 15, 1932. Serial No. 617,366

16 Claims. (Cl. 56—44)

The present invention relates to the drums and picker devices of cotton harvesting machines of the general type illustrated in Patent No. 1,824,223, dated September 22, 1931, and has for its object to improve the construction and operation of the same.

In the machine of the aforesaid patent, the cotton fiber is removed from the boll by means of rapidly revolving picker elements having at their outer ends short curved fingers or prongs. These picker elements are driven through little wheels or rollers engaged with stationary tracks; it being necessary to hold the wheels or rollers and the tracks in good driving contact with each other. Difficulty has heretofore been encountered in compensating for wear, and it has, therefore, been necessary to renew some of the parts at frequent intervals in order to maintain the drives for the picker elements in good working condition. One of the objects of the present invention is to improve the driving means for the picker elements so that compensation for wear will take place automatically over a considerable range; thus making it possible for a drum to be operated for a much longer time than heretofore before any repairs or replacements are necessary.

In the machine of the aforesaid patent the tracks are flexible and are pressed against the rollers or wheels on the picker elements by comparatively large resilient idler wheels. In accordance with the present invention, we do away with these idler wheels and, instead of flexible tracks, we employ rigid members supporting or carrying narrow, thick, resilient tracks or rails; said members being spring pressed so as to hold the tracks or rails and the rollers on the picker elements in driving contact with each other. The actual tracks or rails are preferably made of thick strips of soft rubber that may easily be removed and replaced; the thickness of the rubber determining the amount of wear that must take place before replacements or removals are required.

Therefore, viewed in one of its aspects, the present invention may be said to have for its object to produce a simple and novel track device for driving the rotatable picker elements, which will afford the necessary resiliency or flexibility to compensate for slight variations in the sizes of the rollers on the picker elements and the locations thereof, give the necessary traction, afford long life before replacement is required, and make it inexpensive and easy to replace the parts in which the wear occurs. In the construction disclosed in the aforesaid patent the rollers form part of the picker units so that, whenever a picker head is removed, it is also necessary to remove the corresponding roller. A further object of the present invention is to provide a novel form of picker unit in which the picker head and the driving roller are separate from each other, but are mounted on the drum in such a manner that, when a picker head and the driving roller therefor are assembled on the drum, they are interlocked for rotation in unison, while permitting the picker head to be removed at will while the roller remains within the drum.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 2:
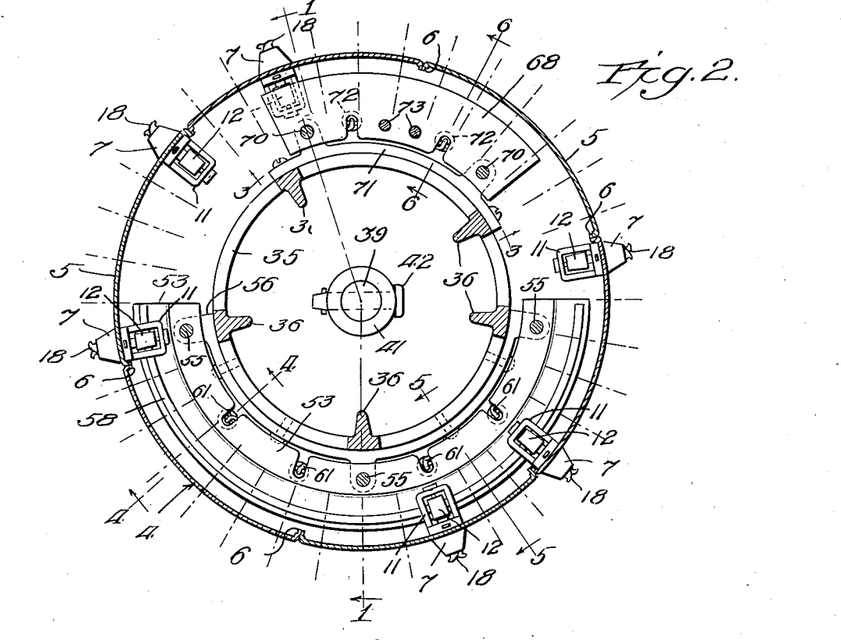
Fig. 2 is a section on line 2—2 of Fig. 1.

Referring to the drawings, 1 and 2 represent circular top and bottom heads which, since they should be strong and rugged, are preferably made of cast metal. Between these heads, and secured thereto at its upper and lower end by means of screws 3, or otherwise, is a cylindrical shell 4 that may conveniently be made of sheet metal. As shown in Fig. 2, this shell is composed of a plurality of sections or staves 5, there being six sections or staves in the arrangement illustrated. The long marginal portion of each section or stave is turned inward to form flanges 6, 6 that provide edge contact faces between the staves wider than the thickness of the sheet metal.

Figures 11, 12:
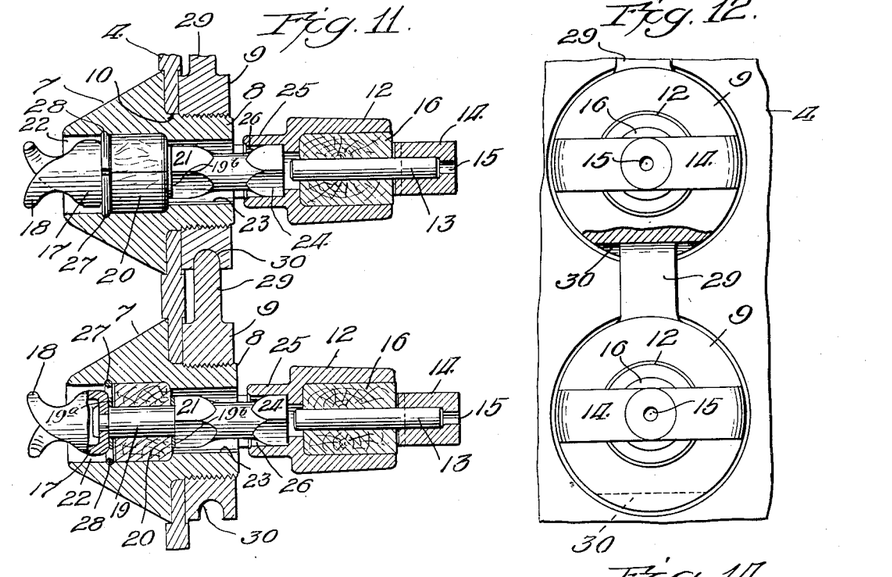
Fig. 11 is a vertical section, on a still larger scale, through the cylindrical wall of the drum and two of the picker units lying one above the other.
Fig. 12 is a view looking at the inside of that fragment of the drum appearing in Fig. 11, a portion of the mounting of one of the picker units being broken away.
Figure 13:
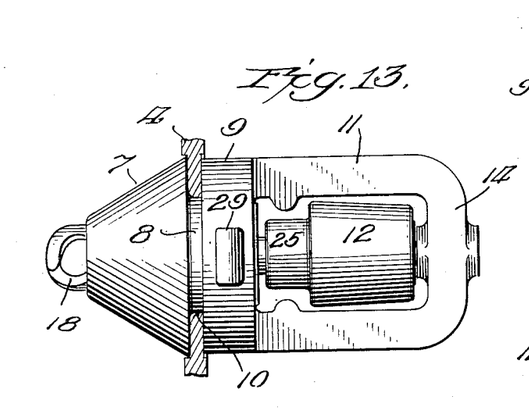
Fig. 13 is a top or bottom plan view of one of the picker units, a fragment of the cylindrical wall of the drum being shown in section.

The cotton picking devices are mounted on the cylindrical wall of the drum in circumferential rows and they may or may not be arranged also in vertical rows. Most of the bolls on cotton plants are found within a foot or eighteen inches from the ground, so that not as many picker devices are needed toward the top of the drum as toward the bottom. The details of the actual picker devices, including picker heads and driving rollers, are best shown in Figs. 11, 12 and 13. The immediate supporting means for the picker heads and the driving rollers are members lying on opposite sides of the cylindrical wall of the drum and united through openings in this wall. These members are in pairs, one member of each pair being an outer cone-shaped part 7 having on the inner end a screw-threaded stem 8; and the inner member of each pair being a nut 9 screwed upon the inner end of the stem. The holes 10 through which the stems 8 pass are accurate, both as to size and location, and the base portion of each stem is machined so that it will accurately fit one of the openings. Each nut member 9 is provided with a U-shaped extension or yoke 11 lying in a horizontal plane. Within the opening in each of the yokes 11 is a roller 12 supported upon a stationary shaft or axle 13. The axle or shaft 13 is preferably made of very hard steel driven at one end into the cross piece 14 of the yoke and extending radially of the drum when the parts are assembled on the drum. The element 14 has therein, in registration with the adjacent end of the axle or shaft 13, a small hole 15 into which a punch may be inserted to drive out the shaft or axle if it be desired to remove the latter. The roller is made of any suitable strong, tough material which is preferably non-metallic. It is provided, however, with a central core 16 of wood impregnated with paraffin; this core forming the actual bearing on the shaft or axle. The core or bushing may, of course, be composed of other so-called oilless bearing materials than wood, although we have found paraffin-impregnated wood to be very satisfactory. The parts are so proportioned that when the roller and the shaft or axle are assembled in the yoke, the roller cannot drop out of position unless and until the shaft or axle is removed.

The actual picker device of each unit consists of a head 17 having thereon curved prongs or fingers 18; these fingers being preferably similar to those disclosed in the aforesaid patent and also in Patent No. 1,854,413, dated April 19, 1932. The head is fixed upon one end of a short shaft 19 surrounded by and rotatable in an oilless bearing which may be a block 20 of wood or other oilless bearing material. The bearing blocks 20, especially those adapted to be used as replacements for worn bearings, may be divided longitudinally into a plurality of parts. The shaft extends a considerable distance beyond the bearing block and is enlarged, as indicated at 21, inwardly from the block. The distance between the picker head and the enlargement is considerably greater than the length of the block to provide room for a pair of washers 19a and 19b pressed upon the shaft on opposite sides of the block and far enough apart to allow the shaft a little end play in the block. The conical member 7 has a central bore into the outer section 22 of which the block 20 fits. The inner part 23 is somewhat smaller in diameter than the part 22 so that, when the bearing block 20 is inserted, it can move inward only until it reaches the inner end of the section 22. With the bearing block in this position, the fingers or prongs of the picker device will be left projecting the proper distance beyond the outer end of the cone. The extension 21 of the picker shaft 19 is made long enough to engage with the roller on the inner side of the drum; this extension and the roller being provided with cooperating parts which will enable the roller to drive the picker element without forming any permanent connection between the picker element and the roller and without imposing on the picker element any other load than that resulting from simple turning force applied to it by the roller. In short, none of the stresses to which the driving roller may be subjected in order to cause it to rotate are transmitted to or borne by the picker element. In the arrangement shown, the inner end of the extension 21 of the picker shaft is made square, as indicated at 24, and the roller has on the adjacent end a projecting hub portion 25 having therein a socket 26 into which the part 24 slidingly fits. It will thus be seen that the actual picker element may be placed in position or be removed without disturbing its driving roller. The picker unit is conveniently secured in the conical block by a suitable resilient split ring 27 that snaps into a groove 28 in the bore 22 just outwardly from the bearing block 20. This ring holds the picker unit in place with sufficient force to prevent accidental separation; but, by applying a suitable tool to the picker head, and exerting a pull thereon, the picker element with its bearing block may be withdrawn.

The two supporting members for the movable parts of each picker device as a whole are mutually supporting but, if the conical member be unscrewed, there is nothing left to support the nut member. We therefore prefer to interlock all of the nut members in each vertical row in the drum so that they will support each other, and one or more of the conical blocks or members may be removed without allowing the corresponding nut member or members to drop down into the bottom of the drum. The nut members may conveniently be interlocked by providing each with an upwardly-projecting wing 29 and, on the under side, diametrically opposite the wing, with a groove or seat 30. The parts are so proportioned that the wing 29 on each nut member fits into the groove 30 in the nut member directly above. Therefore, each nut member, except those in the upper and the lower rows, is interlocked with nut members lying above and directly below the same.

Figure 14:
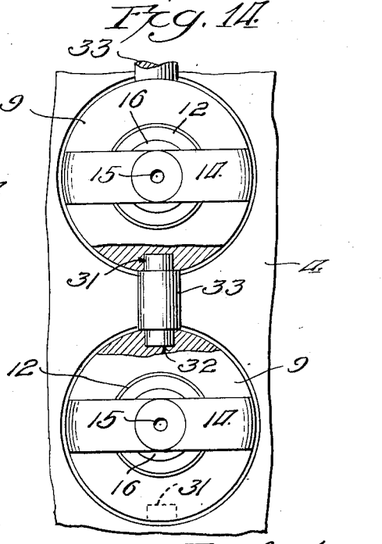
Fig. 14 is a view similar to Fig. 12, showing a modification.
Figure 15:
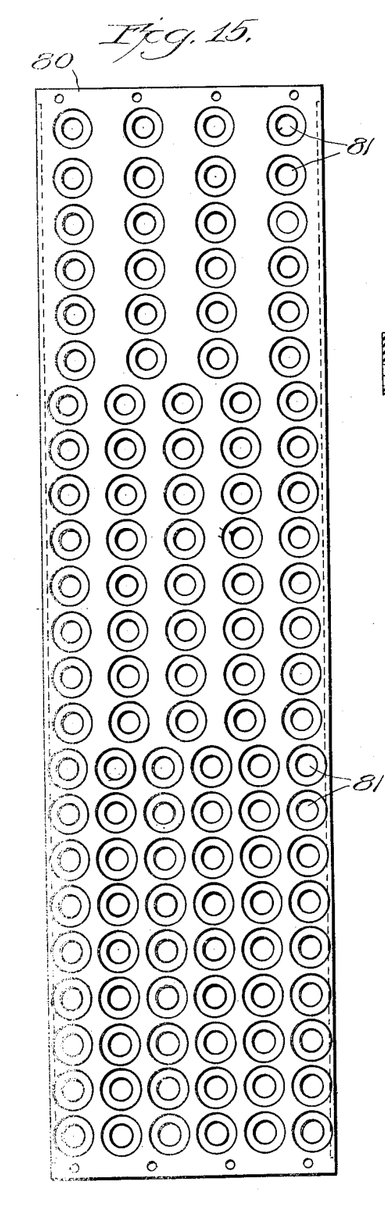
Fig. 15 is an elevation of one of the sections or staves of the drum, illustrating a preferred distribution of the picker devices.

In Fig. 14 there is shown a somewhat different interlock. In this arrangement each of the nuts has holes 31 and 32 bored into the periphery at diametrically opposed points; these holes being at the bottom and at the top, respectively, when the assembly is complete. Into the hole 32 of each of the nut members is driven a pin 33 which enters the hole 31 in the under side of the nut immediately above. Either the holes 31 are made slightly smaller than the holes 32 or the upper ends of the pins are made slightly smaller than the lower ends so that, while each pin is fixed to one nut, it makes sliding engagement with the overlying nut.

It will be noted that there are two kinds of picker elements, right-handed and left-handed. In other words, some of the pickers will collect the cotton fiber from the boll when revolved in one direction and others are adapted to collect the cotton when rotated in the opposite direction. All of the fingers in each circumferential row are of the same kind, either right-handed or left-handed, the rows of right-handed picker elements alternating with the rows of left-handed picker elements. This is for the reason that, in accordance with our arrangement of tracks, the pickers in one row are rotated in the opposite direction from the pickers in the next higher row and in the next lower row.

There are two groups of tracks as in the machine of the aforesaid patent: one set to turn the picker elements in the direction to gather the cotton, and the other set or group serving to turn the elements in the direction to throw off the cotton. While the tracks and the manner of supporting them are the same in both groups, there are some differences in details and therefore they will be described separately. All of the tracks are grouped in the space between a central stationary column of comparatively large diameter and the drum. In the arrangement shown, this column is of a hollow cylinder 35 whose wall is in the form of openwork for the sake of lightness; there being a few internal longitudinal ribs 36, 36 to strengthen the structure. This column has heads 37 and 38 at its lower and upper ends, and it is supported by a short vertical stationary stub shaft 39 set at its lower end in a suitable stationary socket 40 which holds it against rotation; this stub shaft extending up through the lower head 37 and through a hub 41 projecting upwardly from the latter. A pin 42, passing through the hub and the upper end of the stub shaft, secures the column to the stub shaft. A vertical driving shaft 43 extends down through a stationary support 44 above the drum, through the upper head of the drum and a long hub member 45 on the under side of the drum head. The hub 45 is provided with a key 46 engaged with a suitable keyway 47 extending lengthwise of the shaft 43, thereby to effect a driving connection between the shaft and the drum, while permitting the drum to be raised or lowered with respect to the shaft, if desired. The drum is rotatably supported in any suitable way. In the arrangement shown, the upper head 38 of the stationary column is provided with a hollow hub 48 surrounding the hub 45 on the drum. In the space between these two hubs is a suitable roller bearing 49. At the lower end of the drum is a second roller bearing 50 arranged between an upwardly-projecting hub 51 on the bottom head of the drum and a downwardly-extending annular flange or hub 52 on the lower head of the column.

Figure 7:
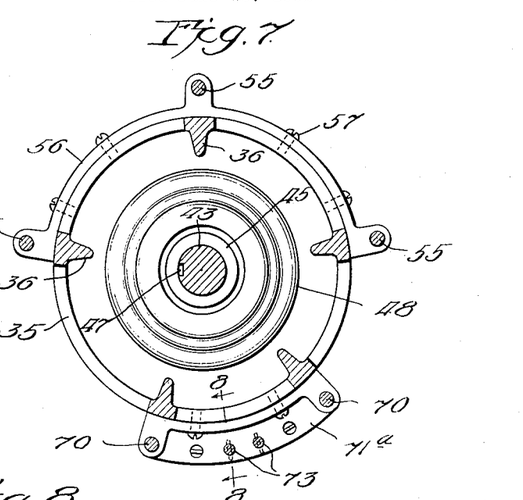
Fig. 7 is a section on line 7—7 of Fig. 1, looking up, and showing only the stationary central portion of the structure, together with the driving shaft and the hub or the upper drum head.
Figure 8:
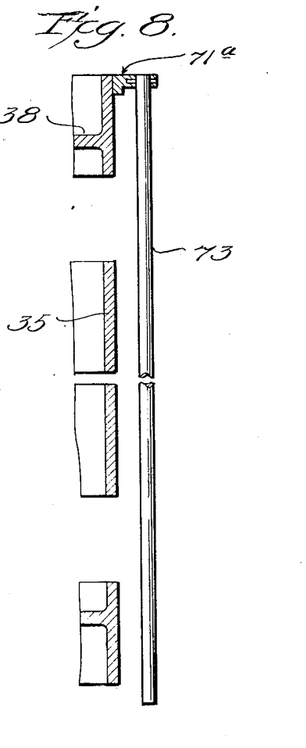
Fig. 8 is a vertical section, taken approximately on line 8—8 of Fig. 7.

The tracks for giving to the picker elements what may be termed forward or collecting turning movements are segmental plates 53 and 54 of large angular length, shown in the drawings as about 180 degrees, provided with suitable tread surfaces. These plates have holes through the same to receive stationary vertical rods 55 fixed to the stationary column. As best shown in Figs. 2 and 7, there are three of these vertical rods, one near each end of the segmental plates and one at the middle; the rods passing through the plates near their inner or concave edges so as to leave the forward or outer portions unobstructed. These rods are shown as being fixed to the hollow column, in spaced relation thereto, by means of supporting brackets 56 curved to fit the cylindrical surface of the column and fastened thereto by means of screws 57 or the like. There are as many of these brackets as are needed to keep the guide rods from bowing or flexing laterally; five brackets being shown, as can best be seen in Fig. 1.

Figure 9:
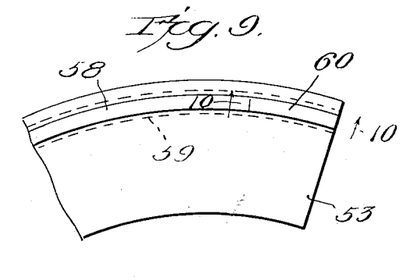
Fig. 9 is a plan view of one end of one of the tracks.
Figure 10:
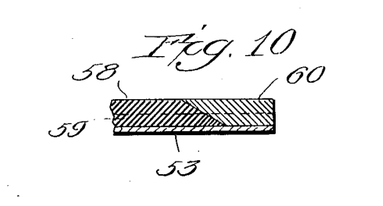
Fig. 10 is a section on line 10—10 of Fig. 9.
Figure 16:
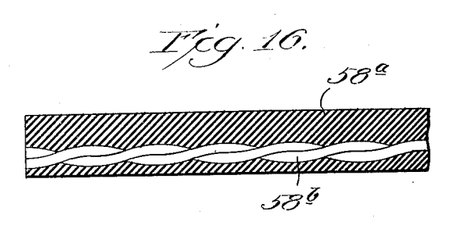
Figs. 16 and 17 are, respectively, a longitudinal and a transverse section through a modified form of rubber track or rail.

The two sets of tracks of which the plates 53 and 54 form part are alike except that the tread surfaces are on the upper faces of the plates 53 and on the under faces of the plates 54. On the plates 53 and 54 are curved rails 58 which are preferably thick strips of soft rubber projecting a considerable distance from the plates; these rails being in the proper positions to engage with the rollers 12 when the parts of the apparatus are assembled. The rubber strips are preferably so shaped as to fit into undercut grooves 59 in the plates 53 and 54. As shown in Fig. 2, these grooves extend from one end of these plates almost but not quite to the opposite end. This arrangement permits the strips to be inserted lengthwise into the grooves and come to rest against solid portions of the plates at the inner ends of the grooves. The open ends of the grooves are at what may be termed the advance ends of the tracks, namely, those ends at which the rollers enter upon the tracks as the drum revolves. By closing the rail-receiving grooves at their rear ends, the pressure of the rollers on the rails will not result in pushing the rails endwise out of the grooves. Sometimes, however, the rollers cause the rubber strips to work back in their grooves, causing the rubber to become compressed and thickened. To prevent this, the rails may be cemented in place or they may be reenforced to resist the tendency to creep ahead of the rollers. Thus, in Figs. 16 and 17, we have shown a rubber rail 58a having in the bottom thereof a rough, easily bendable rod 58b extending throughout the length thereof. The rod may be formed of two annealed wires twisted together. The track plates, as will hereinafter be explained, are yieldingly held in such positions that the rubber rails will be pressed firmly against the overlying or underlying rollers, as the case may be. Therefore, as a roller reaches the advance end of a rail it in effect strikes a blow which soon wears the rubber away. To avoid this, as shown in Figs. 9 and 10, we make each rubber strip shorter than the groove in which it lies and have placed in the groove in front of the strip a short buffer strip 60, the wearing face of the leather strip being flush with the wearing face of the rubber. The buffers absorb the blows of the oncoming rollers and cause the latter to enter upon the rubber sections of the rails by a simple rolling movement. The buffers should not only be more or less yieldable, but they should be made of a material that will wear down as the rubber wears. We have found that leather is a suitable material from which to make the buffer strips, although there may, of course, be other materials that will serve the same purpose.

As heretofore stated, the tracks are arranged in pairs, each pair of cooperating plates consisting of a plate 53 having the rubber rail on the upper side and a plate 54 having its rail on the under side. Two plates, a plate 53 and a plate 54, are placed between the lowermost circumferential row of rollers and the next higher row. Two more plates are placed between the third and the fourth rows from the bottom, two between the fifth and sixth rows, and so on until at the very top, in the arrangement shown there is only a single track. The plates 53 and 54 are slidable up and down on the rods, and some means must be provided to hold them in contact with the rollers. In the arrangement shown, each of the plates 54 is connected to the plate 53 that lies below the same, and with which it forms a cooperating pair, by a plurality of tension springs 61. In the arrangement shown, there are four of these springs between each such pair of plates; the springs being so disposed that the effect is practically the same as though their combined effort were applied at the center of gravity of the tracks, whereby no tendency to tilt the plates results.

Figure 5:
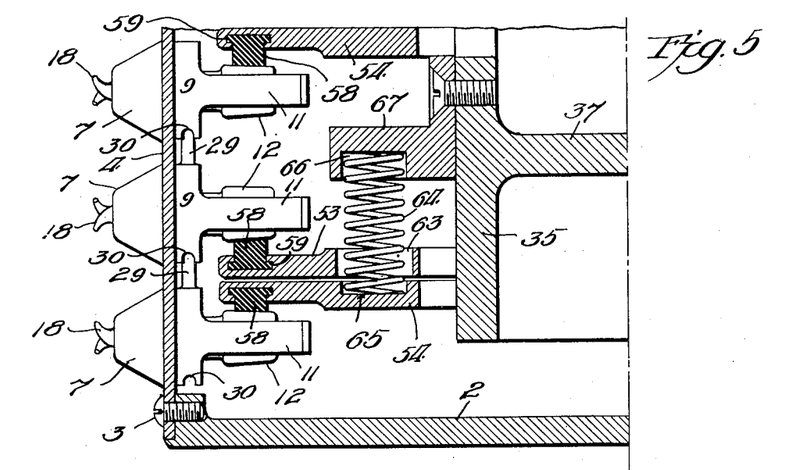
Fig. 5 is a section on line 5—5 of Fig. 2, showing only the lower portion of the drum, the scale being the same as that of Fig. 4.

It is desirable that the lowermost row of picker elements be as close to the lower end of the drum as possible in order to collect low-lying cotton. Therefore, while each of the other rows of picker elements is driven by one of a cooperating pair of tracks, the track that overlies and drives the lowermost row of picker elements is an extra track and not one of a pair. The lowermost track device therefore requires special spring means to hold it pressed against the rollers which it is to drive. As best shown in Fig. 5, the lowermost track plate 53 has holes 63 through the same. Compression springs 64 pass down through these holes and rest in seats 65 in the upperface of the underlying plate 54 that forms part of the track for the lowermost row of picker elements. The upper ends of the springs 64 are engaged in sockets 66 in the under side of a bracket or brackets 67 fixed to the hollow column. The springs 64 are placed under an initial compression, so that they will hold the rail on the lowermost track plate firmly against the lowermost row of rollers and will cause that plate to follow down as the rubber rail wears away; thus maintaining efficient traction between the rail and the rollers. So, also, the tension springs serve to produce and, as wear takes place, maintain traction for all of the other rollers. By making the rubber strips comparatively thick, it will take a long time for them to wear down to the point where they must be replaced.

Figure 1:
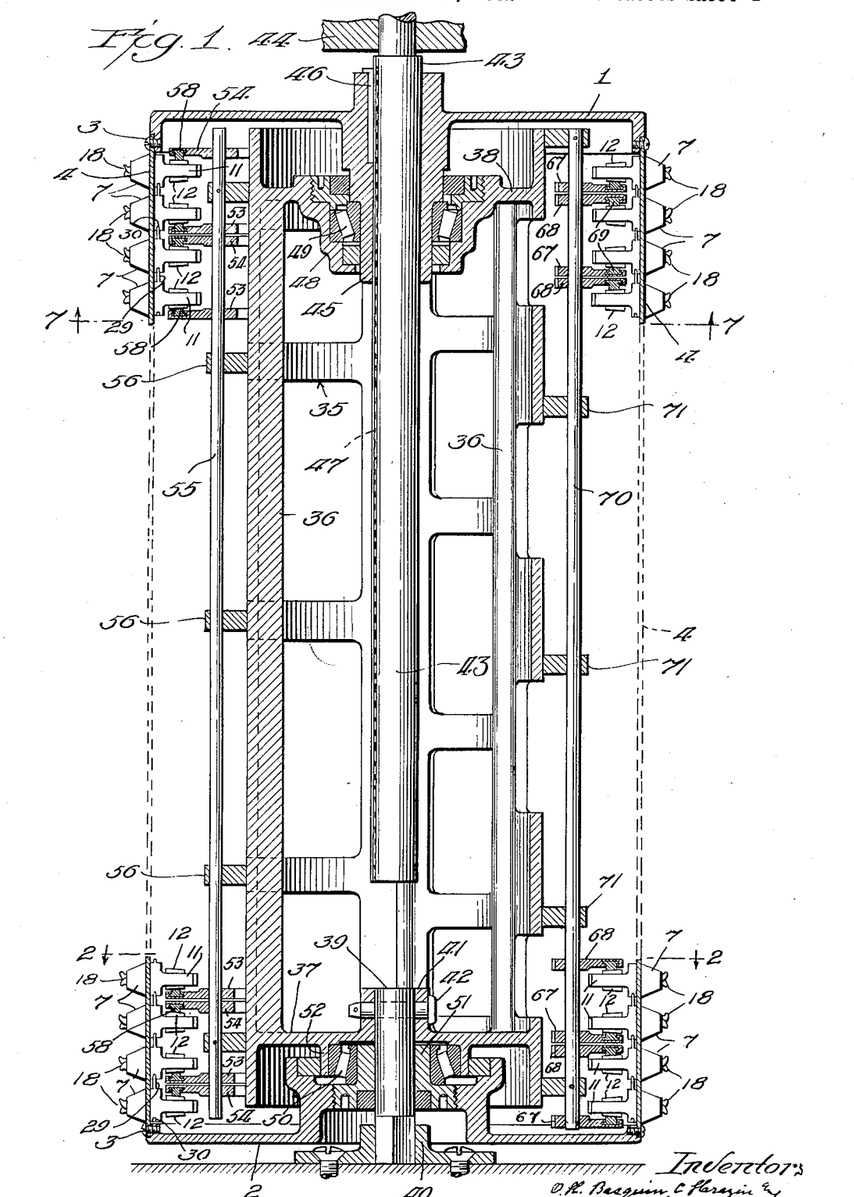
Figure 1 is a vertical section through one of our improved drums, the section being on line 1—1 of Fig. 2, only the upper and lower portions of the cylindrical wall of the drum appearing in the planes on which the section is taken, together with the adjacent picker elements, being shown.

The second group of tracks that we have to reverse the direction of rotation of the picker elements so as to doff the cotton, are quite similar to those just described, only they are shorter. Thus, the segmental plates 67 and 68, with their rubber rails 69, may correspond in every respect with the plates 53 and 54 and the rails 58 on the latter, excepting only that they are of lesser angular length. By examining Fig. 1 of the drawings, it will be seen that the tracks on the left-hand side are disposed only in the alternate spaces between the circumferential rows of rollers, so that half of these spaces are empty. The other group of tracks, for a reverse turning of the picker elements, shown at the right-hand side of Fig. 1, are disposed in such horizontal planes that they lie in the spaces which are empty on the other side of the drum and leave empty those spaces which on the other side of the drum are filled by the tracks that turn the picker elements in the forward direction. In other words, whenever a roller is running along an overlying track on the left-hand side of the drum, it will run along an underlying track when it reaches that side of the drum which is the right-hand side in Fig. 1. Similarly, any roller which, on the left-hand side of Fig. 1, is riding upon an underlying track will run along an overlying track when it reaches the right-hand side. Obviously, therefore, each picker element will be turning toward the right part of the time and a part of the time toward the left.

Figure 3:
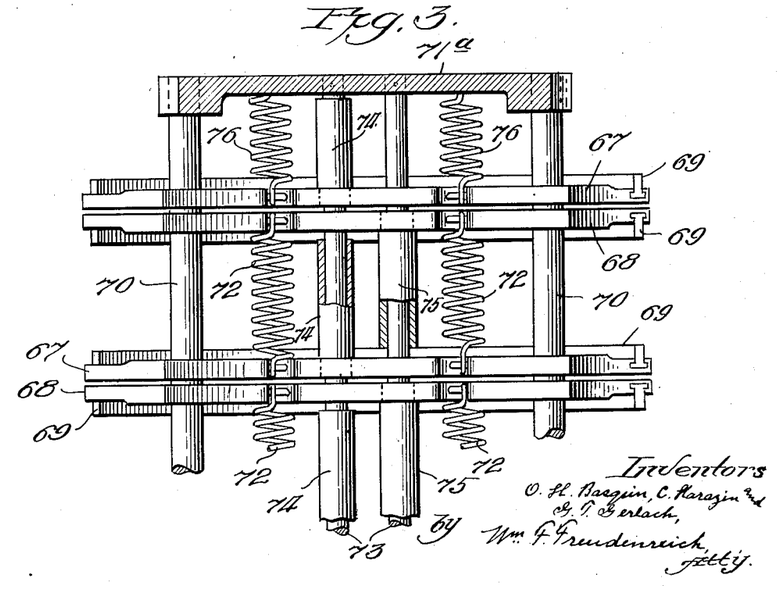
Fig. 3 is a section, on a larger scale, on line 3—3 of Fig. 2 showing the two upper pairs of tracks and fragments of the supporting means therefor.
Figure 4:
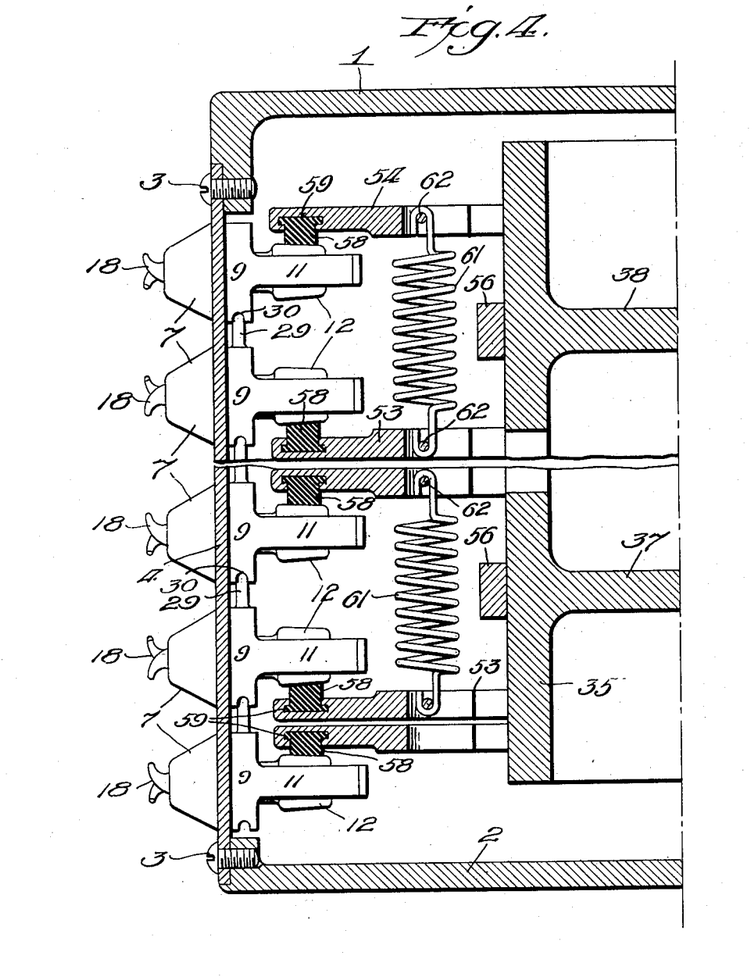
Fig. 4 is a section, on the same scale as Fig. 3, on line 4—4 of Fig. 2.

The plates 67 and 68 are slidable on vertical guide rods 70, similar to the guide rods 55, and fixed in brackets 71, similar to the brackets 56. Each of the plates 68 is connected to the next underlying plate 67 by a pair of coiled tension springs 72 which serve to draw the plates 68 down and the plates 67 up. However, because of the shortness of the plates 67 and 68, the springs 72 cannot be placed so that the resultant effort is applied at the center of gravity of these plates, but they act more or less eccentrically. Therefore, we have provided additional guide rods to prevent the springs from tilting the plates 67 and 68. There are two of these guide rods 73, 73, rather close together, midway between the ends of the plates; these guide rods being hung from the upper bracket 71a. As best shown in Fig. 3, each of the plates 67 has fixed thereto a long sleeve 74 that surrounds one of the rods 73 and each of the plates 68 is provided with a similar sleeve 75 that surrounds the other rod 73. These sleeves form long guide bearings for the plates and make tilting thereof impossible.

Figure 6:
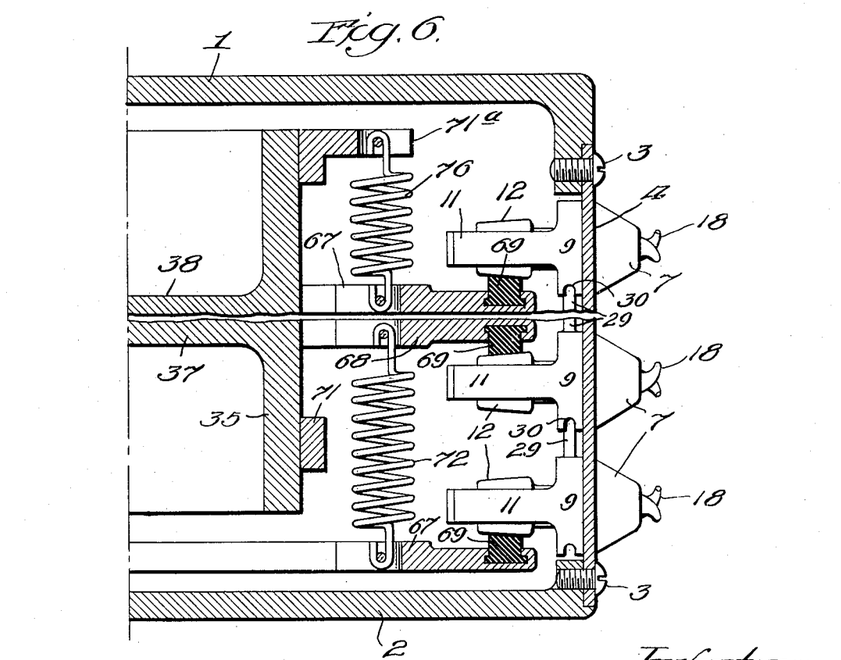
Fig. 6 is a section, on the same scale as Figs. 4 and 5, on line 6—6 of Fig. 2.

Fig. 3 also illustrates another detail which also appears in Fig. 6. The uppermost plate 67, of course, has no overlying plate 68 and the springs which pull it up must therefore be anchored to some element other than a track member. Since the bracket 71a is positioned a short distance above the uppermost track plate 67, we have anchored to this bracket the upper ends of the springs 76 that pull up on the upper plate 67.

It will now be seen why the prongs on some of the picker elements are curved toward the left while others are curved toward the right because, regardless of whether a picker finger is running over one of the long tracks or over one of the short tracks, it is always turning in the opposite direction from the finger directly above and the finger directly below. Therefore, if the picking devices are to function properly, half of them must be right-handed and the other half left-handed.

Figure 17:
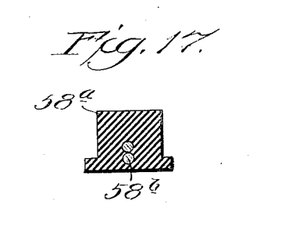

As heretofore explained, the bulk of the cotton to be picked lies within a foot or eighteen inches from the ground. The cotton bolls thin out toward the top of the plant, but some will be found at or near the top. The drums of cotton harvesting machines of the type under discussion must therefore be made long enough to reach the highest cotton as well as that in the zones of denser distribution. While the drums should be long or high, it is not necessary that there be as many picker elements where there is little cotton to be picked as in regions where there is more cotton; and, consequently, the number of picker units in a circumferential row may decrease from the bottom toward the top of the drum. In Fig. 17 we have shown a panel or stave 80 for a drum in which the number of picker units decreases toward the top; the panel or stave having holes 81 for the reception of the picker units. It will be seen that the holes are arranged in three groups of horizontal rows, the rows of the lowermost group each containing six holes, those of the intermediate group five holes, and the rows of the upper group four holes. Any other desired distribution of the holes may be adopted, however. The chief advantage of distributing the picker units according to the usual distribution of the bolls on the cotton plant is, of course, the avoidance of excess parts; thus lowering the initial cost of the machines and the cost of maintenance.

While we have illustrated and described with particularity only a single preferred form of our invention, with slight modifications, we do not desire to be limited to the exact structural details thus illustrated and described; but intend to cover all forms and arrangements which come within the definitions of our invention constituting the appended claims.

We claim:

1. In a machine of the character described, a rotatable drum, rotatable cotton-picker devices mounted on and arranged radially of the drum, said devices having prongs projecting beyond the periphery of the drum and curved about the axes of rotation of the devices, the prongs on some of the devices being curved in the right hand direction and the others being curved in the left hand direction, and means to rotate said devices about their individual axes when the drum revolves.

2. In a machine of the character described, a hollow rotatable drum, picker devices extending radially through and rotatable in the cylindrical wall of the drum, rollers mounted in the interior of the drum in registration with the picker devices, cooperating elements on the picker devices and the rollers to interlock each picker element with the corresponding roller against relative rotating movements while permitting them to be separated from each other by relative movements in the axial direction, and means in the drum to turn said rollers as the drum revolves.

3. In a machine of the character described, a hollow rotatable drum, the cylindrical wall of the drum having numerous openings therethrough, rollers positioned on the inner side of said wall each in registration with one of said openings, devices on the inner side of the drum supporting said rollers so that each is rotatable about an axis radial to the drum, picker devices, stationary bearings for the picker devices mounted in said openings, each picker device and the corresponding roller having cooperating shoulders to cause them to rotate together when the roller is rotated, and means to rotate the rollers when the drum is revolved.

4. In a machine of the character described, a hollow rotatable drum, the cylindrical wall of the drum having numerous openings therethrough, rollers mounted on the inner side of said wall each in registration with one of said openings and rotatable about an axis radial to the drum, picker devices mounted in said openings, each roller having in the outer end a non-circular socket, each picker device having at the inner end a part adapted to enter the socket in the corresponding roller when the device is inserted in its opening in the drum, and means to rotate the rollers when the drum is revolved.

5. The combination with the cylindrical wall of a drum of a cotton picking machine having an opening therethrough, of a conical boss engaged with the outer face of said wall and having a stem extending through said opening, a bracket on the inner side of said wall screwed upon the said stem, a roller rotatably mounted in said bracket, and a picker device extending through said boss radially of the drum and interlocked with the roller so as to turn therewith.

6. The combination with the cylindrical wall of a drum of a cotton picking machine having an opening therein, of two members lying on opposite sides of said wall in registration with said opening, a part on one of said members extending through said opening and screwed into the other member to draw said members into clamping relation to the wall, a roller rotatably mounted in the inner member, and a picker device rotatably mounted in the outer member, said picker device and said roller having cooperating elements forming a driving connection between the roller and the picker device.

7. The combination with the cylindrical wall of a drum of a cotton picking machine having an opening therein, of two members lying on opposite sides of said wall in registration with said opening, a part on one of said members extending through said opening and screwed into the other member to draw said members into clamping relation to the wall, a roller rotatably mounted in the inner member, and a picker device rotatably mounted in the outer member and movable into and out of the same through the outer end of the same, said picker device and said roller having cooperating elements forming a driving connection between the roller and the picker device while permitting the picker device to be moved into and out of the said outer member at will.

8. In a machine of the character described, a hollow rotatable drum, picker devices extending radially of the drum through the cylindrical wall thereof and arranged in rows extending circumferentially around the drum, rollers connected to the inner ends of the picker devices to turn the same, pairs of segmental tracks located within the drum, one track of each pair overlying the rollers of one of the rows of picker devices and the other track underlying the rollers of the next lower row of picker devices, means supporting the tracks against movement angularly of the axis of the drum while permitting them to move bodily in the direction of the length of the drum, and springs connecting each pair of tracks together and drawing them firmly against the rollers lying between them.

9. In a machine of the character described, a hollow rotatable vertical drum, a stationary column of considerable diameter within and coaxial with the drum, rotatable picker devices extending radially through the wall of the drum and arranged in circumferential rows, driving rollers for the picker devices at the inner ends thereof, pairs of segmental tracks in the space between the said column and the drum, one track of each pair overlying the rollers associated with one of the rows of picker elements and the other track underlying the rollers associated with the next lower row of picker elements, springs connecting the tracks of each pair together and drawing them firmly against the rollers interposed between them, and rods fixed to said column and extending lengthwise thereof through openings in said tracks to hold the tracks against lengthwise movement while permitting them to move up and down.

10. A track for a rotatable cotton picker element in a cotton harvesting machine, comprising a metal segment having a curved groove extending lengthwise thereof in one of its flat faces, and a strip of soft rubber fitted in said groove and projecting above said face.

11. A track for a rotatable cotton picker element in a cotton harvesting machine, comprising a metal plate having in one face a long curved groove, and a strip of soft rubber fitted in said groove and projecting above said face.

12. A track for a rotatable cotton picker element in a cotton harvesting machine, comprising a supporting member having a long curved groove in a face thereof, and a strip of soft rubber fitted in said groove and projecting above said face.

13. A track for a rotatable cotton picker element in a cotton harvesting machine, comprising a supporting member having a long curved groove in a face thereof, a strip of soft rubber fitted in said groove and projecting above said face, said groove being longer than the rubber strip, and a short strip of leather fitting in the groove in contact with one end of the rubber strip, the outer faces of the leather and the rubber being flush with each other.

14. A track for a rotatable cotton picker element in a cotton harvesting machine, comprising a supporting member having a long curved groove in a face thereof, a strip of soft rubber fitted in said groove and projecting above said face, said groove being longer than the rubber strip, and a short buffer strip fitting in the groove in contact with one end of the rubber strip, the outer faces of the leather and the rubber being flush with each other.

15. A track for a rotatable cotton picker element in a harvesting machine, comprising a metal plate having a curved groove in a face thereof, a strip of soft rubber fitted in said groove and projecting above said face, and a reenforcing element embedded in and extending lengthwise through said strip.

16. An upright drum for a machine of the character described having projecting picker elements extending around the same in horizontal rows distributed from top to bottom, the number of said elements per row being less toward the top of the drum than toward the bottom.

OLIN H. BASQUIN.
CHARLES HARAZIN.
GLENDON T. GERLACH.